United States Patent
Brooks et al.

(10) Patent No.: US 10,915,835 B2
(45) Date of Patent: Feb. 9, 2021

(54) SYSTEMS AND METHODS FOR MAXIMIZING EXPECTED UTILITY OF SIGNAL INJECTION TEST PATTERNS IN UTILITY GRIDS

(71) Applicant: 3M INNOVATIVE PROPERTIES COMPANY, St. Paul, MN (US)

(72) Inventors: Brian E. Brooks, St. Paul, MN (US); Yang Lu, Singapore (SG); Andrew T. Tio, Singapore (SG); Chong Yang Ong, Singapore (SG); Gilles J. Benoit, Minneapolis, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 572 days.

(21) Appl. No.: 15/889,637

(22) Filed: Feb. 6, 2018

(65) Prior Publication Data
US 2018/0165606 A1 Jun. 14, 2018

Related U.S. Application Data

(63) Continuation of application No. 15/324,809, filed as application No. PCT/US2015/040350 on Jul. 14, 2015, now Pat. No. 9,922,293.
(Continued)

(51) Int. Cl.
*G06N 3/00* (2006.01)
*G06N 20/00* (2019.01)
(Continued)

(52) U.S. Cl.
CPC .............. *G06N 20/00* (2019.01); *G06N 7/005* (2013.01); *G06Q 50/06* (2013.01); *G05B 23/0256* (2013.01)

(58) Field of Classification Search
CPC ........ G06N 20/00; G06N 7/005; G06Q 50/06; G05B 23/0256
See application file for complete search history.

(56) References Cited

U.S. PATENT DOCUMENTS

| | | |
|---|---|---|
| 7,821,156 B2 | 10/2010 | Katz et al. |
| 7,945,524 B2 | 5/2011 | Anderson et al. |
| (Continued) | | |

FOREIGN PATENT DOCUMENTS

| | | |
|---|---|---|
| CN | 103633739 | 3/2014 |
| CN | 103904641 | 7/2014 |
| (Continued) | | |

OTHER PUBLICATIONS

Memarzadeh et al., "Optimal Planning and Learning in Uncertain Environments for the Management of Wind Farms," Journal of Computing in Civil Engineering, vol. 29, No. 5, Sep. 2015.
(Continued)

*Primary Examiner* — Robert G Bachner

(57) ABSTRACT

Methods and systems for implementing experimental trials on utility grids. Variations in grid parameters are selected to introduce into utility grids to improve the value of learning from each experimental trial and promoting improved utility grid performance by computing expected values for both learning and grid performance. Those trials are used to manage the opportunity costs and constraints that affect the introduction of variations into utility grid parameters and the generation of valid data that can be attributed to particular variations in utility grid parameters.

15 Claims, 6 Drawing Sheets

Related U.S. Application Data

(60) Provisional application No. 62/025,610, filed on Jul. 17, 2014.

(51) Int. Cl.
    *G06N 7/00*      (2006.01)
    *G06Q 50/06*      (2012.01)
    *G05B 23/02*      (2006.01)

(56) References Cited

U.S. PATENT DOCUMENTS

| | | |
|---|---|---|
| 7,991,512 B2 | 8/2011 | Chandra et al. |
| 8,103,388 B2 | 1/2012 | Goodnow et al. |
| 8,121,741 B2 | 2/2012 | Taft et al. |
| 8,164,217 B1 | 4/2012 | Miller |
| 8,234,016 B2 | 7/2012 | Boss et al. |
| 8,279,870 B2 | 10/2012 | Flammer, III et al. |
| 8,494,826 B2 | 7/2013 | Richards et al. |
| 8,504,214 B2 | 8/2013 | Genc et al. |
| 8,509,953 B2 | 8/2013 | Taft |
| 8,571,721 B2 | 10/2013 | Boss et al. |
| 8,583,405 B2 | 11/2013 | Chow et al. |
| 8,589,198 B2 | 11/2013 | McMullian |
| 8,600,572 B2 | 12/2013 | Sri-Jayantha |
| 8,639,392 B2 | 1/2014 | Chassin |
| 8,761,952 B2 | 6/2014 | Forbes, Jr. |
| 2008/0262820 A1 | 10/2008 | Nasle |
| 2009/0027037 A1 | 1/2009 | Strnad et al. |
| 2010/0177450 A1 | 7/2010 | Holcomb et al. |
| 2010/0306014 A1 | 12/2010 | Chow |
| 2011/0112987 A1 | 5/2011 | Basak et al. |
| 2011/0125657 A1 | 5/2011 | Boss et al. |
| 2012/0155557 A1 | 6/2012 | Bush et al. |
| 2012/0310559 A1 | 12/2012 | Taft |
| 2013/0077367 A1 | 3/2013 | Zhu et al. |
| 2013/0138482 A1 | 5/2013 | Anderson et al. |
| 2013/0191052 A1 | 7/2013 | Fernandez et al. |
| 2013/0191320 A1 | 7/2013 | Avritzer et al. |
| 2013/0204557 A1 | 8/2013 | Trudnowski et al. |
| 2013/0232094 A1 | 9/2013 | Anderson et al. |
| 2013/0268131 A1 | 10/2013 | Venayagamoorthy et al. |
| 2014/0019397 A1 | 1/2014 | Alexander |
| 2014/0032187 A1 | 1/2014 | Legbedji et al. |
| 2014/0100810 A1 | 4/2014 | Nielsen |
| 2014/0148962 A1 | 5/2014 | Venayagamoorthy |

FOREIGN PATENT DOCUMENTS

| | | |
|---|---|---|
| WO | WO 2013/074588 | 5/2013 |
| WO | WO 2013/166510 | 11/2013 |

OTHER PUBLICATIONS

Pasdar, "Detecting and Locating Faulty Nodes in Smart Grids Based on High Frequency Signal Injection," IEEE Transactions on Smart Grid, Jun. 2013, vol. 4, No. 2, pp. 1067-1075.

Pierre, "Probing Signal Design for Power System Identification," IEEE Transactions on Power Systems, May 2010, vol. 25, No. 2, pp. 835-843.

International Search Report for PCT International Application No. PCT/US2015/040350, dated Nov. 6, 2015, 4 pages.

Kurniawati et al., "SARSOP: Efficient Point-Based POMDP Planning by Approximating Optimally Reachable Belief Spaces," Robotics: Science and Systems IV, (XP055753054) Jun. 25, 2008.

SYSTEMS AND METHODS FOR MAXIMIZING EXPECTED UTILITY OF SIGNAL INJECTION TEST PATTERNS IN UTILITY GRIDS

BACKGROUND

The performance of utilities grids—their reliability, safety, and efficiency—can be drastically improved through sensing key parameters and using those results to direct the operations and maintenance of the grid, by identifying faults, directing appropriate responses, and enabling active management such as incorporating renewable sources into electrical grids while maintaining power quality.

Sensor networks are often used to monitor utilities grids. These sensor networks may include smart meters located at the ends of the grid, sensors at grid nodes, and sensors on or around the utilities lines, these sensors measuring grid parameters such as flow rates in water grids, power quality in electrical grids, or pressures in utilities grids. These sensors are transducers, usually outputting analog signals representative of the measured properties. These outputs need to be characterized to map to specific values of those properties, and/or classified so that they may represent particular states of the world, such as a potential leak that requires investigation, or identification of a difference in phases when incorporating a renewable resource into an electrical grid. Characterization of sensors is usually done through bench testing, while the sensors may have various interferences in the environment surrounding them; in-situ characterization of sensors on a utility grid monitoring network would be preferred, but is difficult for the large numbers of sensors used to monitor a utilities grid.

The trend in analyzing sensor data and directing responses is "big data," which uses large amounts of grid historical data to build models used for classification and direction of responses. These big data models, however, are limited to correlations, as they mine historical data to build the models, limiting their effectiveness for actively directing treatments or making fine adjustments. Further, these big data models typically require large volumes of data that prevent highly granular understandings of grid conditions at particular grid nodes or locations or that can only achieve such granularity after long operations; some have applied machine learning techniques and improved models to increase speed and granularity, but even these approaches continue to rely on correlations from passively collected historical data.

Signal injections have been used to highlight grid faults, such as discovering nodes where power is being illegally drawn from an AC power grid, or to test grid-wide response to large changes in high levels of the grid, such as at the HVDC distribution level. These signal injections have been large, individual, and human mediated, and used to evaluate the system, not the sensors monitoring the system.

Utilities grid management would benefit greatly from real-time cause-and-effect understanding of sensor responses, remedying the issues with big data smart grid approaches and allowing for real-time, granular, and fine-tuned grid monitoring and management.

SUMMARY

The present invention is directed towards methods for increasing the value of signal injections into a utility grid by receiving signal injection characteristics for a plurality of potential signal injections, receiving current sensor belief states, computing the learning value of each of the plurality of signal injections, selecting some of the plurality of potential signal injections based on the learning values, and implementing those selected signal injections.

DETAILED DESCRIPTION

Figure 1:
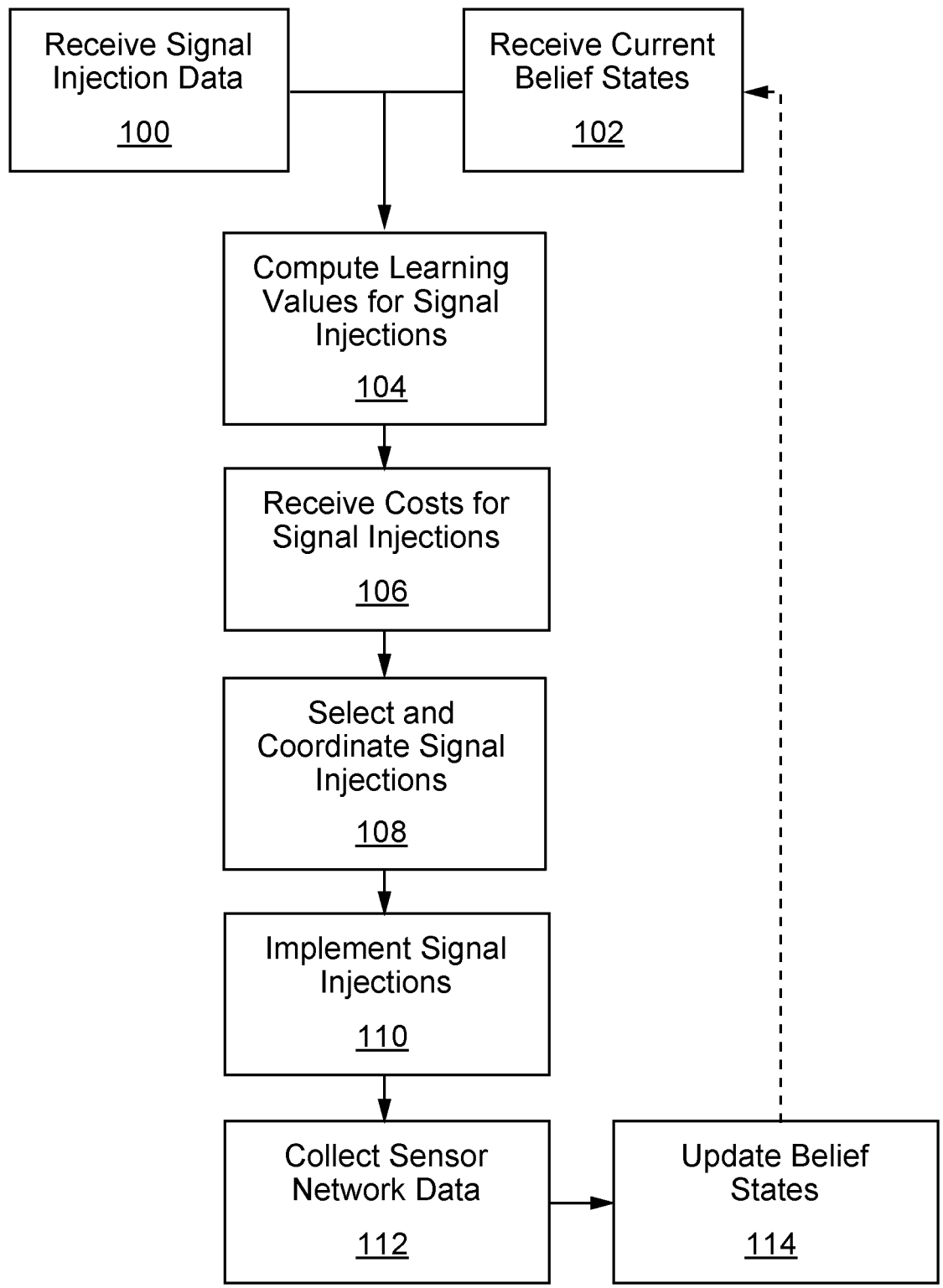
FIG. 1 is a flow diagram of the steps of a method of the invention.

Signal injections into utilities grids provide a valuable means of characterizing sensors situated on or near a utility grid, and discovering utility grid response characteristics. However, the number of potential signal injections may be limited by the need to ensure that signal injections that are concurrent do not interfere with one another; systems coordinating the injection of signals into a utility grid benefit from a means of automatically identifying and implementing the most informative and/or lowest-opportunity cost signal injection patterns that can be made to improve efficiency in using limited time and space to test and understand grid and sensor responses.

Signal injections to be made into utility grids are changes to grid parameters particular to those grids, such as voltage levels or wave forms in electrical grids, pressures and/or flow rates in gas grids, flow rates in water grids. The signal injections may be electrical signal injections in such as increases or decreases in current, voltage, or power factor caused by actuating controls. The signal injection may be implemented through automatic or human-mediated means. In gas grids, the signals may be injected through, for example, changing the routing of gas through pipes to increase or decrease the pressure at certain points. The responses to these signals may be the increase or decrease in the number and/or severity of leaks detected by a sensor network surrounding the grid pipes, or changes in downstream pressures connected to the areas being driven to high or low pressure. These signal injections may be accomplished in human-mediated cases through the manual adjustment of various valves and switches at the direction of a schedule distributed to maintenance personnel who perform these adjustment; these schedules may take various forms, such as maintenance queues, additional tasks, and may be distributed through a variety of electronic means such as email, text message, calendar reminders on a computer, tablet, smart phone or other portable computing device. In these human-mediated cases, the times of these adjustments may be audited by having the maintenance personnel check in using a networked device to record the time the changes are actually implemented, for use in the processing of subsequent data generated as a result of these signal injections. In fully machine-to-machine implemented embodiments of signal injection on gas grids, the switches and valves are operated by actuators coupled to the system through a wired or wireless communications network, and responding to signals sent by the system or acting in accordance with instructions or schedules distributed to the controllers for those actuators by the system. Machine-to-machine implementations allow for more closely coordinated tests as there will be less variance in the time of implementation, and the improved timing allows more sophisticated trials to be conducted. In these implementations, monitoring of the sensor conditions and actuator states may be constantly correlated to create a real-time understanding of relationships among spatially and temporally distributed influences, enabling changes in relationships as well as local sensor states to be detected and characterized, for example through factorial isolation of detected changes.

In electrical grids, human-mediated methods involve manual switching of power flow, activating or deactivating power sources connected to the grid, adjusting the position of load tap changers, switching capacitor banks on and off, activating or deactivating heavy industrial equipment such as arc furnaces or other major manually-controlled major power loads on the grid. In these examples, the changes are made by the maintenance personnel at the direction of a schedule distributed to them; these schedules may take various forms, such as maintenance queues, additional tasks, and may be distributed through a variety of electronic means such as email, text message, calendar reminders on a computer, tablet, smart phone or other portable computing device. In these human-mediated cases, the times of these adjustments may be audited by having the maintenance personnel check in using a networked device to record the time the changes are actually implemented, for use in the processing of subsequent data generated as a result of these signal injections. These human-mediated methods may alter measurable factors such as power quality, line temperature, line sag, available power levels, and other factors, which may be captured by sensor networks observing those measurable grid factors.

In electrical grids, machine-to-machine methods offer a greater measure of control, and can inject signals through a variety of automated means. This includes automation of the types of switching and maintenance behaviors that may be used in human-mediated examples such as changing the position of load tap changers or switching capacitor banks, and additionally M2M methods of signal injection may capitalize on greater precision and breadth of control to include actions such as coordinating use of devices such as appliances at end locations to create coordinated demand and loading at consumer locations, or to implement complex coordination of combinations of multiple types of grid-influencing actions to generate more complex conditions, or introducing changes into the automatic power factor correction units. These combinatoric possibilities are very difficult to address through big-data approaches, since even large volumes of data may only have limited sample sizes reflecting particular combinations, and the sheer number of combinatoric possibilities makes big data solutions to these problems nearly intractable. These may be initiated through automatic control of the associated grid components and networked devices, including power generation, switches, voltage regulation equipment, smart meters and smart appliances receiving power from the grid, and other grid components susceptible to remote control by the system. These may take advantage of millisecond-level control capabilities to manipulate power quality variables such as the integration of new sources or immediate responses to new loads or the specific operation of automatic power factor correction units, as well as further increase the ability to test combinatorics of grid actions or conditions involving those highly time-sensitive variables.

Signal injections may be selected for their potential to falsify current models of sensor response, to characterize the sensor responses (for example, that a particular level of output from the sensor is indicative of a particular level of the sensed variable) or to classify the sensor responses as indicative of a particular event either categorically (for example, in a water grid, that particular sensor output signals from two sensors are indicative of a severe leak being present) or probabilistically (for example, in a gas grid, that a particular electrical output from a methane sensor is 60% likely to indicate a Category 3 leak, 30% likely to indicate a Category 2 leak, and 10% likely to not be indicative of a leak). Grid responses to perturbations of known type and magnitude allow for the testing and potential falsification of these models, allowing systems to converge on characterizations or classifications for raw sensor outputs that are based on their in-situ performance and readings, streamlining the process of sensor characterization for detecting events and states of utility grids.

The injected signals may be simple, directing one grid action such as opening a valve in a water or gas grid, or bringing one particular renewable source online or altering the output voltage from one substation in electrical grid examples to induce the desired, controlled change to grid conditions, or they may be complex, composed of multiple grid actions coordinated such that their individual spatial and temporal reaches overlap to produce a multi-factor treatment at areas within the overlapping reaches. One example of a complex grid action may be to vary both load tap changer positions and capacitor bank switching simultaneously to provide more fine-grained control over reactive power in an electrical grid. This multi-factor treatment may include variances of multiple different grid parameters, for example to explore combinatoric effects of those parameters, or may be used to produce multiple instances of similar variations of a particular grid parameter, for example to use additive effects to increase the magnitude of a particular variance of a grid parameter at one or more specific locations on the grid while protecting more sensitive neighboring parts of the grid by keeping them within narrower or different operational ranges by exposing those parts to only a component of the overall signal injection.

For complex signals, the temporal and spatial reaches are predicted based on treating the complex signal's effects on the system as a whole, composed set. For those complex signals, while individual grid actions will have overlapping spatial and temporal reaches, the defined set of grid actions that make up the complex signal is instead treated as one signal injection, with the overall spatial and temporal reach of the combination of the defined set of grid actions used to determine the areas of space and periods of time where no other signals may be injected into the grid, to maintain the orthogonality of the complex signal injection from other grid signal injections.

Complex signals may be input into the system having already been defined as the set of grid actions to be done together and the times and locations of those grid actions, after being derived by other systems or selected by grid personnel, or may be derived by systems selecting multiple grid actions from the set of grid actions as directed by, for example, a Partially Observable Markov Decision Process (POMDP) model exploring combinatorics or operating within constraints on operational conditions that vary from location to location across the grid.

Signal injections exploring grid responses may be composed by searching for waveforms that have a spatial-temporal regularity with any controlled grid activity, which are co-occurring in immediate or regular delayed fashion, for example through Principal Component or Fourier analysis. These statistical regularities in waveforms or component waveforms (for example, the frequency, voltage, and/or current) link grid actions with changes in grid conditions to provide the set of available options for manipulating grid conditions based on active control of grid actions and data on the observed times and locations of these waveform components relative to the grid actions may be used to determine spatial and temporal reaches for particular signal injections.

FIG. 1 is a flowchart outlining a method embodiment of the invention. Signal injection data is received in step 100 and current sensor belief states are received in step 102. The sensor belief states are used along with the signal injection data to compute learning values for signal injections in step 104. Costs and benefits for signal injections are received in step 106. Signal injections are selected and coordinated based on computed values in step 108, and the signal injections are implemented on the utility grid in step 110. Sensor data may be collected from a sensor network on the utility grid in step 112, and that collected sensor data used to update models of sensor response, such as classifiers, probability estimates and/or characterization models in step 114.

Signal injection data received in step 100. The signal injection data is the time, location, and attributes of the signal to be injected into the utility grid, with the attributes of the signal injection including, for example, the changes made to the grid to implement the change, or the magnitude of the signal being added and the type of the signal. The signal injection itself is a change in grid controls affecting grid parameters. In an electrical grid, an electrical signal injection may be an increase or decrease in voltage, current or power factor resulting from the change in state of a control. For example, a signal injection in an embodiment of the invention directed to water distribution grids may have a nature described by the closing of two valves at one node on the water distribution grid and the opening of another at an adjacent node. The attributes of the signal injection indicate what grid parameters are likely to be altered by the signal injection, with the signal injection being a particular selection of grid controls from the ordinary operational ranges of those grid controls. This may in turn be used to determine which sensors would have their outputs affected by the signal injection. For another example, a signal injection in an embodiment of the invention directed to electrical grids may have its attributes described as the addition of reactive power at a substation, implemented by switching on a number of capacitor banks. The location of the signal injection may be given in terms of a grid location, such as the particular valves, lines, transformers, substations, or sources that will be used to implement the signal injection, or geographic coordinates where the signal injection will be implemented.

Current belief states are received in step 102. Steps 100 and 102 may be performed simultaneously or in either order, with step 100 preceding or following step 102. The belief states are a set of different models of sensor response, each model corresponding to a relationship between the sensor output and the events or world states acting on the sensor to produce that output. These models may each be, for example, classifiers mapping the sensor outputs to specific world events or states, probability estimates mapping the sensor outputs to a plurality of possible world states, or characterization models mapping sensor outputs to particular levels of a sensed variable. These belief states may have attached uncertainty values reflecting the likelihood that they are accurate given the current set of trials and knowledge that may tend to confirm or falsify these different models, and the information that can further confirm or falsify the models may be included in this data or derived from the basic characteristics of the particular model.

The learning value that a signal injection can provide, for example by reducing the uncertainty around the current set of belief states is computed in step 104. The learning value is a measure of the value that knowledge generated as a result of the signal injection may provide to subsequent decision-making by a system, such as value that could be provided by reducing uncertainty in a sensor measurement, or determining that a particular action is more likely to be optimal. The learning value may be computed through, for example, predicting the raw number of belief states that may be falsified according to the predictions of a Partially Observable Markov Decision Process (POMDP) or other statistical model, predicted impacts of the signal injection on the uncertainty levels in the belief states in such models, or experimental power analyses computing the reduction in uncertainty and narrowing of confidence intervals based on increasing to the current sample size. For a particular example, a Bayesian Causal Network may be used to identify dependencies in the data to discover potentially valuable trials that may efficiently refine a grid control system's knowledge of sensor response. Systematic multivariate experimentation is done to analyze the directionality and variables involved in the underlying causal paths for those waveform components, by going back to the normative operational constraints and using constrained randomization, and experimental designs (such as Latin Square) to systematically explore which grid control elements and combinations thereof are the underlying cause of the waveforms. These experimental designs may be iterated to refine the analysis, for example eliminating three-fourths of the controls on a basic first pass, through elimination of those controls that are random with respect to the waveform components of interest, and then using factorial combinations of the remaining controls in a second trial to properly identify the control or combination of controls causally linked to those waveform components of interest.

Figure 4:
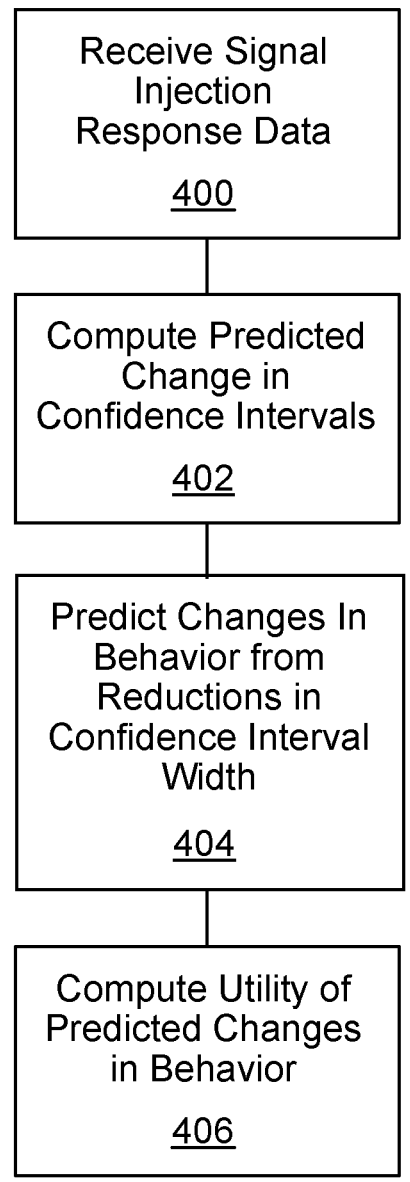
FIG. 4 is a flow diagram of an example method for computing the learning values of different signal injections.

An example of one method for computing the learning value of a signal injection is presented in FIG. 4. Current signal injection response data is received 400, a predicted change in confidence intervals through an additional signal injection is computed 402, changes in optimal behavior are computed for the predicted change in confidence intervals in step 404, and the utility of the predicted changes are computed in step 406.

The current signal injection data is received 400. The current signal injection may be, for example, a table of inferential statistics describing the relationship between a particular signal injection and the response of sensors during times and locations associated with the signal injection. This may take the form of a mean response and confidence intervals for the response.

For the signal injection data, a predicted change in confidence intervals for a signal injection is computed in step 402. This may be computed through an experimental power analysis to determine the reduction in confidence intervals by increasing the sample size compared to the current signal injection data.

The predicted confidence intervals are used to compute a predicted change in behavior in step 404. The current overlap in confidence intervals may be used to determine the relative frequency of actions or the relative weight of competing models of sensor response. Changes to the size of the confidence intervals based on a particular signal injection, as computed in step 402 through power analysis and the increase in sample size, will alter the overlap in the confidence intervals. A prediction of the change in the relative frequencies can be computed using the optimization module that selects among or weights the different actions or models of sensor response.

The utility of the predicted changes is computed in step 406, based on the predicted change in relative frequencies and the predicted outcomes of the actions using the predicted confidence intervals. The utility computed in step 406 is output for use as the learning value of the signal injection, representing the value that can be extracted from the knowledge gained by making a particular signal injection as part of a coordinated set of signal injections used to perturb a utility grid where automated experimentation is used to improve the efficiency when testing grid response and associated sensor response.

The learning value may also be modified by the potential value of increasing the particular type of knowledge that the trial will examine or the utility of further refining the models being tested. The metrics affected and models refined through signal injections may differ in type and therefore offer different values to grid operators, such as one signal injection improving fault detection while another would refine knowledge for demand reduction on an electrical distribution grid, or there may be non-linearities in the value that additional learning or refinement of grid and sensor response models provides to grid operators. For example, in gas grids, the number of small leaks vastly outpaces the ability of maintenance resources to address the small leaks, so improvement in localization of Category 1 leaks may provide less value to gas grid operators than improvements in the identification of leaks that are likely to worsen over time. This may be represented by utility functions that incorporate the value of the type of learning along with the magnitude of the learning, or predictions based on models used to plan grid responses to mitigate harm or increase efficiency, and project the additional cost savings that they can determine with improved data having reduced uncertainty values. For example, a capital planning module for grid improvements may derive one set of values for an equipment replacement problem on a utility grid given the current set of data, but alternative data sets based on reductions in uncertainty that are possible through additional trials may be input into the module, and the differences between the current and reduced-uncertainty cases used to estimate a value for the potential uncertainty reduction that may be realized through implementing trials through particular signal injections into the utility grid.

Cost Information is received in step 106; this may be computed from the signal injection characteristics and model data, based on the details of implementing the signal injections included in the signal injection data received in step 100. The costs of the trials includes the actual cost to generate the signal and observe the response, for example reductions in flow rates leading to less chargeable distribution of water or gas to customers of those grids, or the cost of deploying a maintenance crew to an area to implement a human-mediated signal injection, and may also price in risks associated with signal injections, such as increased risk of the sensor network missing particular events occurring within the spatial and temporal uncertainties for the trial due to the sensor outputs being driven by the signal injection, or potential disruptions to scheduled maintenance due to temporal uncertainty regarding signal injection duration and the need to avoid interfering with trials, or use of resources to introduce human-mediated signal injections. This may be done, for example, by discounting a projected cost of the risk event by a projected increase in likelihood of that event by the implementation of the signal injection, creating an expected value for the added risk introduced by the signal injection.

The computation of the costs for signal injections may vary based on the locations and periods of time captured within the spatial and temporal reach of the signal injection and the time and location where the signal injection is implemented. These opportunity costs may be predicted through use of normative operational condition data that includes local granularity, such as different tolerance ranges for different nodes or geographical segments along the grid or during particular periods of high or low stress on the grid, through component modeling reflecting the ages, maintenance conditions and types of components making up the grid infrastructure in different locations across the grid, and/or the use of grid state or use data to determine opportunity costs over time. For example, power quality baseline standards used to determine the extent of deviation from those standards may vary depending on the characterizations of the electrical grid users drawing power at a particular place and time, to account for the different sensitivities of different devices to aspects of power quality, for example, the susceptibility to electrical noise of computers as opposed to lighting, whose use may vary with the types of users and the times at which users draw power from the grid. For example, an area known to contain data centers may have a higher coefficient that is used for calculating the cost associated with increases in electrical noise, specific to making local determinations of the cost of signal injections which are predicted to impact the amount of electronic noise experienced by that portion of the grid. Cost data may also include benefits of the signal injection based on the expected effects of the signal injection on the grid parameters and the desirability of those changes in grid parameters. The combined cost and benefit data provides an expected effect value which may be combined with the learning value to determine a value for the signal injection. The expected effect value is a prediction of the value of a signal injection based on the impact of that signal injection on grid parameters. The expected effect value may be positive or negative, representing improvement or degradation in grid performance metrics. For an example of a negative expected effect value, a signal injection that is predicted to reduce power factor delivered by an electrical grid will have an expected effect value based on the expected reduction in power factor, modified by a weighting factor that represents the cost created by the reduction in power factor.

The learning values and cost data are used to compute utilities and coordinate signal injections based on those utilities in step 108. The utility for a particular signal injection is determined through a utility function that incorporates the value of implementing a particular signal injection and the improvement in knowledge likely to result from it from step 104 against the potential costs and risks of implementing the signal injection detailed in the cost data from step 106, modified by other factors and converted to common metrics which may be arbitrary or based in values such as currency. Signal injections are coordinated such that the signal injections remain orthogonal to one another through ensuring that they do not have spatial and temporal overlap in the areas they are expected to have observable influence; this may be done through using historical data associating grid conditions with grid actions, such as by identifying waveform components in the electrical waveform on a power grid through Fourier or Principal Component Analysis that are associated with the grid actions that make up the signal injection, or using other models of grid characteristics such as the current belief states or component models and physical characteristics to predict the spatial and temporal reach of the signal injection. The coordination of these signal injections may be done through graphical modeling techniques such as Bayesian networks or Markov random fields or subspecies thereof. The coordinated signal injections are selected to maximize the computed utility over time; this may be done as the signals are coordinated through the graphical model, or may be done by coordinating multiple possible sets of signal injections using the graphical model, finding the sum utility over time for each and selecting the set of signal injections from those multiple possible sets based on that aggregate utility. Calculating utility for full sets of signal injections across the grid allows those embodiments of the invention to capture the opportunity costs inherent in the need to maintain orthogonality among the signal injections, since each signal injection necessarily limits the other potential signal injections through those temporal and spatial reaches which may not overlap. Selecting signal injections and implementing them into the grid in this manner increases the efficiency at improving the understanding of sensor outputs along the utility grid by automatically managing numerous tradeoffs and opportunity costs existing where signal injection spatial and temporal reaches may not overlap.

Figure 5:
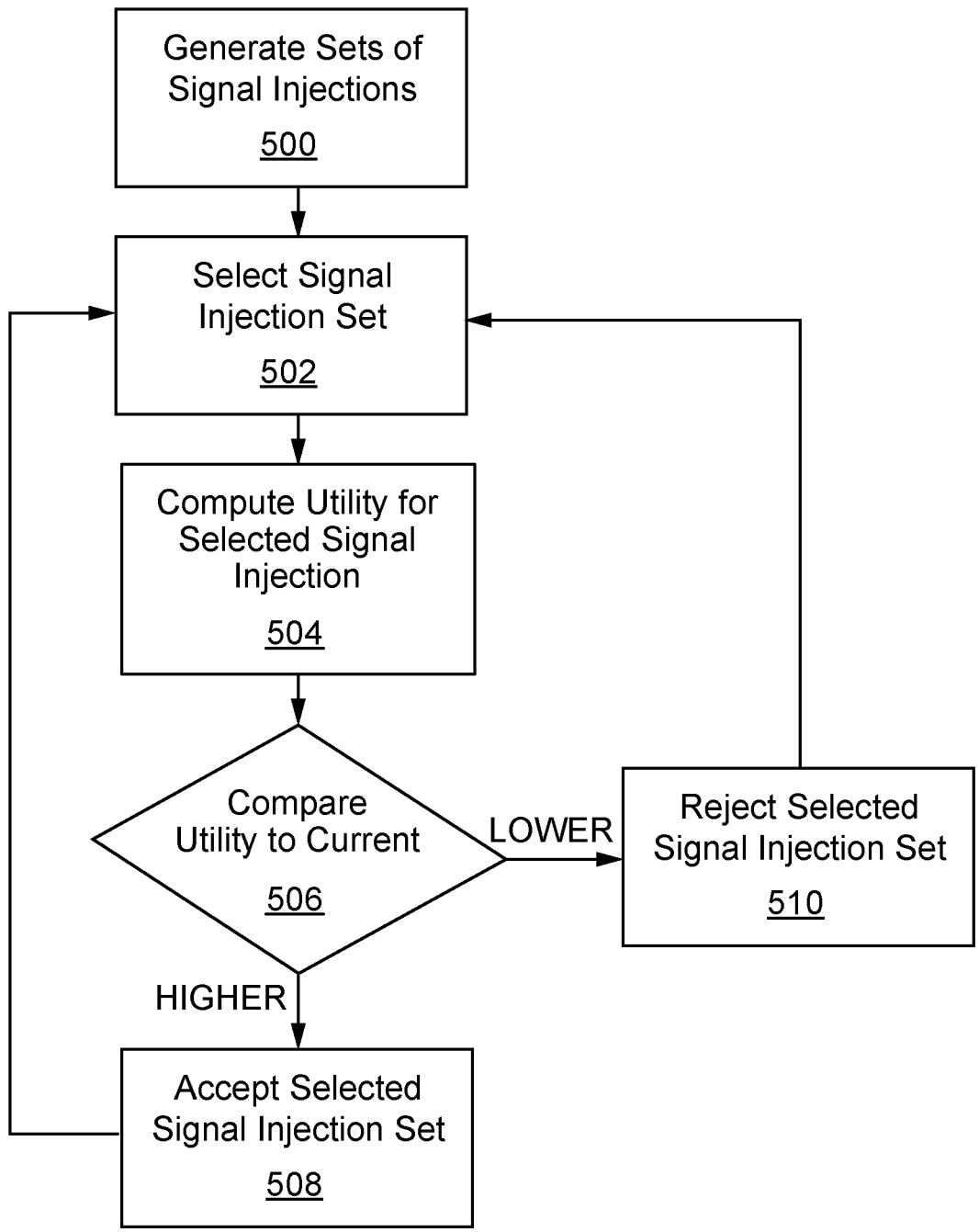
FIG. 5 is a flow diagram of an example method for determining the utility of signal injections and coordinating the signal injections according to their utility.

One example of a process used to select a set of signal injections to implement on the utility grid is presented in FIG. 5. A plurality of sets of signal injections are generated 500, a set of signal injections is selected from that plurality 502, the utility for that set of signal injections is computed 504 and compared to the utility of the set of signal injections scheduled for implementation 506. If the selected set has higher utility than the scheduled set, the selected set replaces the scheduled set 508. If the selected set does not have higher utility, it is rejected 510. Either way, the process is iterated for all of the plurality of sets of signal injections until each has been evaluated.

A plurality of sets of signal injections are generated in step 500. This may be done through methods such as graphical models, Bayesian Causal networks, or other methods generating a set of permissible signal injections which do not have overlap in their spatial and temporal reaches. From this plurality, an individual set is selected 502. This selection may be randomized or done in some sort of sequential order. Using the learning values and costs for each signal injection that is included in the set, utilities are computed for each signal injection and summed together to produce the utility for that set of signal injections to compute the utility for the selected set of signal injections 504.

For the first selected set of signal injections, the baseline utility is zero, so that set is accepted as the signal injection set to be scheduled for implementation in accordance with step 508. For all other selected signal injections in iterations of this example, the utility of that selected signal injection is compared to the utility of the signal injection set scheduled for implementation 506. If the selected signal injection set has a higher utility than the scheduled signal injection set, the selected signal injection set is accepted 508, by making the selected signal injection set the new scheduled signal injection set, discarding the prior scheduled signal injection set. If the selected signal injection set has a lower total utility than the scheduled signal injection set, the selected signal injection set is rejected 510 by discarding the selected signal injection set. After either acceptance or rejection of the selected signal injection set, the process is iterated by selecting a new signal injection set from the plurality 502, until all of the signal injection sets in the plurality have been tested. The final scheduled signal injection set at the end of this process is implemented into the utility grid to perturb the grid to efficiently produce knowledge that is used to drive subsequent operations or improve interpretation of sensor responses.

Returning to FIG. 1, the selected signals or combination of signals is then injected into the appropriate locations on the sensor network in step 110. The signals are injected into the sensor network according to the coordinated set of signal injections and upholding their temporal and spatial uncertainty constraints, by taking the directed grid actions at the proper times and locations. The signal injections may be implemented by human actors, such as grid maintenance personnel, by directing them to perform the grid actions such as operating switches in electrical grids, or opening and closing valves on water and gas distribution grids, through distributing appropriate instructions to those grid personnel through means such as email systems, automated messaging, queuing systems, or other means of instructing the human actors on what actions to take to influence the grid and when and where to implement them. The signal injections may also be partially or wholly implemented through machine-to-machine actions, such as having processors direct the actions of actuators controlling switches and valves, or controllers automatically directing the activation of renewable sources or otherwise implementing the directed grid actions, based on signals and/or data distributed to those processors and actuators, switches, sources and other grid components detailing the grid actions to take and the time and location for those grid actions to be taken. The injection of these signals perturbs the utility grid, enabling more efficient generation of relevant knowledge about grid and sensor response by controlling opportunity costs of different signal injections that produce different types and amounts of knowledge while often being mutually exclusive due to confounding and the need to attribute particular sensor responses and grid events with particular signal injections.

Monitoring sensor responses to the signal injection may be done at step 112. The sensors are distributed across the utility grid, and may be integrated with the grid, in examples like sensored cables and terminations on electrical grids, placed on the grid such as the sensors included in smart meters on electrical grids, or may be placed in proximity to the grid such as methane sensors in gas distribution grids. The sensors typically are transducers that produce an electrical waveform as output when exposed to the sensed variable, although this electrical response may be partially or wholly non-linear. The sensor outputs may have metadata associated with the outputs to provide indications of the time and location where the signal is collected, such as a timestamp and an identification number for the sensor which can be cross-referenced with a database of the sensor numbers and their locations, allowing the sensor output data to be parsed by time and location to associate them with particular signal injections based on the reach of those signal injections and the time and location at which the signal injections were implemented.

The belief states may be updated based on the sensor responses and the signal injection properties in step 114. The signal injection characteristics and the sensor data associated with the signal injections are used to test and confirm or falsify the related belief states. In one example, this may be done through comparison of the associated signal injection output data and predictions made regarding each belief state model makes regarding the response the model would expect to that signal injection based on its characteristics. In this example, the model predictions of sensor response, derived based on the signal injection characteristics and the models for each belief state being tested, are compared with the actual associated response of the sensors to the signal injection; based on the accuracy of the predictions, models may be falsified depending on the extent to which they deviate from the real observed values. Associated sensor data may also be used to update the means and reduce the size of the confidence intervals associated with data concerning grid responses to particular grid actions taken in the associated signal injections, or added to databases of historical knowledge used as the basis for sensor characterization models in some example embodiments of the invention, improving the precision and accuracy of sensors whose raw outputs are classified or characterized through these improved models of sensor response.

Figure 2:
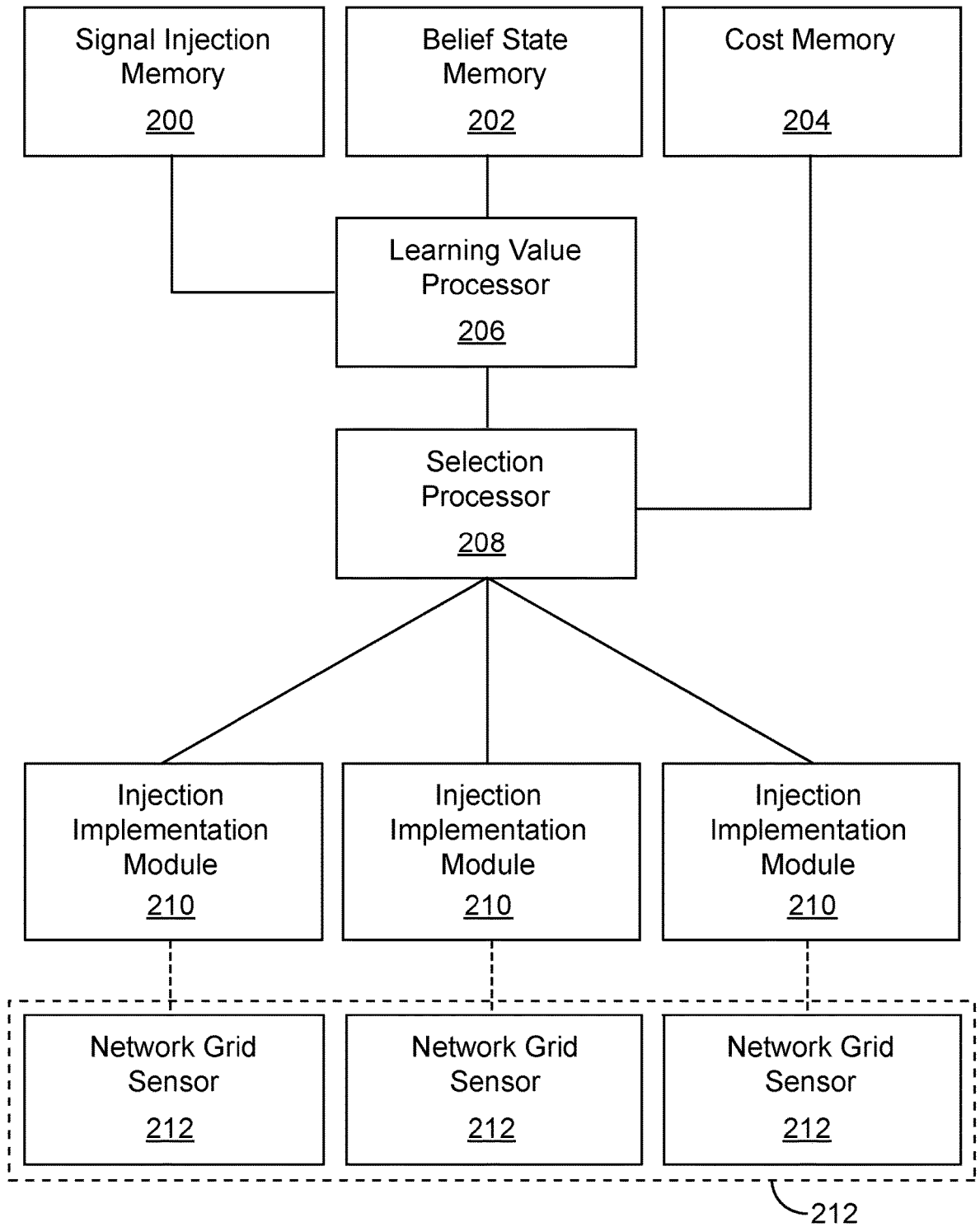
FIG. 2 is a system diagram depicting an example of a system embodiment of the invention.

FIG. 2 is a diagram of an example embodiment of the invention as a coordinated utility grid system. Memories may be known computer storage means such as flash memory, hard disk drives using magnetic media, or other methods for data storage that can store the data and be accessed frequently and regularly. Processors may be configured to make the calculations through software instructions. Connections among the components may be hardwired, use of common processors for multiple steps, or networked through wired or wireless means such as the various 802.11 protocols, ZigBee or Bluetooth standards, Ethernet, or other such means for transmitting data among the separate sensors, processors, memories and modules. The sensors, memories, processors, and modules may be distributed across locations, including at the sensors or on grid locations themselves, or co-located in intermediate or central locations.

Signal injection memory 200 stores the characteristics of signal injections that may be made into the utility grid. This memory is configured to store the characteristics of potential signal injections, including the time, location, magnitude and parameters being affected by the signal injection. This memory may also store implementation data for the signal injection, such as the set of instructions to be presented to grid personnel for human-mediated embodiments, or the actuators and commands to be distributed to them in machine-to-machine embodiments of the invention.

Belief State Memory 202 stores the current set of belief states. It may be a database containing the models that are used to classify or characterize sensor outputs, such as classifiers, probability estimates, and models mapping the output signals of the sensors to the transduced variables at the location of the sensor. These belief states may also include other factors or metadata representative of the level of certainty regarding the accuracy of the model, or the types of signals that may confirm or falsify the accuracy with which the model properly represents what is being sensed based on the sensor's output signal.

Cost memory 204 stores information on the potential costs of the signal injection. This may be a database of potential grid actions combined with a set of costs associated with that particular grid action, representing the cost and risks associated with including that grid action as part of a signal injection that may be implemented. Such costs include potential losses such as reductions in chargeable provision of the utility due to reductions in flow to certain areas, the cost of dispatching grid personnel to implement the changes, risks of deviating from normative operational parameters, or loss of some sensing abilities because of the signal injection overwhelming or masking other changes in the sensed variables at sensors. This data may be organized such that particular grid actions are valued differently at various times and locations due to differences in the costs to be expected for those different implementations, such as discounting the loss of potentially chargeable utility distributions at times where demand would be met by the diminished flow of the utility, or by region such as having different renewable sources of the same type having different costs to power quality disruptions they introduce because of different local markets they serve that differ in sensitivity to that power quality.

Learning Value processor 206 computes the expected value that can be associated with falsifying belief states or improving confidence intervals used in models representing grid conditions detected by grid sensors for a particular signal injection. The learning value processor 206 may compute the number of belief states confirmed or falsified by a particular trial based on the current values of the belief states and the characteristics of the signal injection, may use power analysis to predict the reduction in uncertainties to result from increases in the sample size, or discovery of dependencies in the data. The learning value processor 206 may be configured to apply POMDP or Bayesian Causal Networks, for example, to determine these values. The learning value processor 206 may optionally be configured to account for differences in the relative value of types of knowledge about grid conditions, or non-linearities in the value of such knowledge, for example by applying a utility function or applying modification factors to different quantities representing the potential reductions in uncertainty or belief states to be falsified, based on the nature of those learnings and the potential improvements in grid operation that can be expected from such learnings.

Selection Processor 208 coordinates signal injections to maintain orthogonality using the spatial and temporal reaches of the signal injections and generates a set of coordinated signal injections based on the expected utility of the set of signal injections that directs the implementation of those signal injections into the utility grid. The Selection Processor 208 may be configured to coordinate of these signal injections by applying graphical modeling techniques such as Bayesian networks or Markov random fields or subspecies thereof to ensure that the spatial and temporal reaches of signal injections are non-overlapping. The Selection Processor 208 may be configured to apply a utility function to the learning value and the associated costs of a signal injection to determine the signal injection's utility, which is used in creating a final coordinated set of signal injections to the utility grid.

Injection Implementation Modules 210 may be tools for distributing and ensuring compliance with instructions governing the signal injections and their coordination across the utility grid in human mediated embodiments, and/or may be processors, controllers, and actuators used to automatically implement the signal injections in machine-to-machine embodiments of the invention. Examples include, for machine-to-machine examples, actuators controlling valves in water and gas grids, control circuits and actuators for load tap changers situated at electrical substations, switches controlling connections between distributed power sources such as solar or wind generators and the remainder of the grid, or switches for capacitor banks in electrical distribution grids. For human-mediated embodiments, examples include automatic generation and distribution of emails or text messages, computing devices carried by maintenance personnel and the servers they sync to for receiving queuing instructions and reporting completion of tasks such as taking actions that implement signal injections and status of the grid and/or completion of assigned maintenance tasks.

Grid sensor network 212 may be a plurality of sensors distributed across the utility grid to measure grid parameters, such as flow rates, current, voltage, line temperature, line sag, and whose output may reflect the changes in grid conditions resulting from signal injections. These sensors may be, for example, methane detectors, sensored cable terminations, water flow meters, electrical "smart meters", or other such grid sensors. These sensors monitor changes in grid conditions stemming from the implemented signal injections, and that data may be parsed according to the spatial and temporal reaches of the signal injections based on the time and location at which the sensor captures the data.

Figure 3:
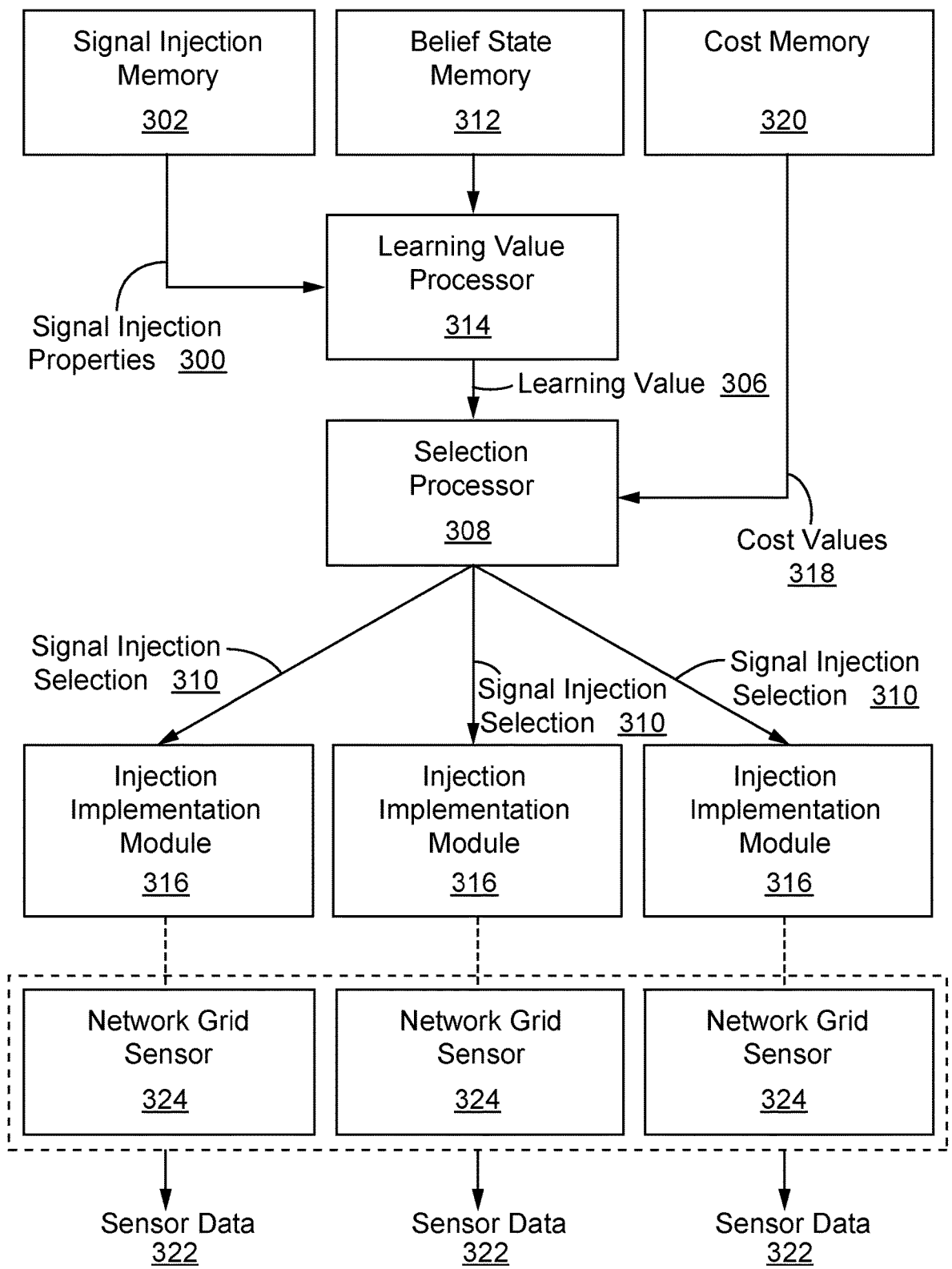
FIG. 3 is a data flow diagram of the flows of information among various components of a system of the invention.

FIG. 3 is a data flow diagram showing an example embodiment of the invention as a coordinated utility grid system and outlining the generation, flow and transformation of data by various system elements and actions taken by system elements.

Signal injection properties 300 are data describing the signal injections that may be made on the grid, including factors such as the location and magnitude of such signal injections, the grid actions that are performed to implement each signal injection. This information is stored in the signal injection memory 302, and transferred to the learning value processor 304 so that the signal injection properties may be used to derive the learning value 306 of that signal injection, and the selection processor 308 to be coordinated and chosen for utility to produce the signal injection selection 310.

Belief States 312 are a set of models that potentially describe the relationship between sensor outputs and grid conditions, such as classifiers, probability estimates or characterization models. These models also may include metadata concerning the certainty of the models, the historical performance of the models, and/or the information that is likely to confirms or falsify those models. It is stored in belief state memory 314 and is transferred to the learning value processor 304 so that the impact of signal injections on the number and/or certainty of belief states may be computed. The belief states may also be updated based on parsed sensor data associated with particular signal injections, based on the extent to which the parsed sensor data matches predictions of response to the signal injection made by each belief state model.

Learning values 306 represent the value of learning associated with a particular signal injection, and are computed by the learning value processor 304 based on the signal injection properties 300, the belief states 312 and optionally may include scaling factors or be based on utility calculations that account for the value of particular fields of learning, based off of relative values among and non-linearities within the value of increasing knowledge of grid and sensor responses. The learning values 306 are transferred from the learning value processor to the selection processor 308 where they are used as a basis for computing signal injection utilities when generating the coordinated signal injection selection 310.

Cost Values 318 are data representative of the costs and risks associated with implementing signal injections, such as the ordinary costs of implementation such as maintenance personnel tasks, or reduced opportunities to provide customers with the utility, risks associated with temporary loss of sensor sensitivity or of departing from normative operational constraints. They are received, such as from user input or from databases containing the cost information, or derived from signal injection properties 300 and stored in cost memory 320, and transferred from cost memory 320 to selection processor 308 to be used in computing signal injection utilities that are used to generate the coordinated signal injection selection 310.

Signal Injection Selection 310 is derived at the selection processor 308 and is the coordinated set of signal injections that is then distributed to the signal injection module or modules 316, directing the grid actions such as, for example, switching of capacitor banks, activation of distributed generation resources, or adjusting the pressure of gas in a line, that will implement the coordinated signal injections and perturbing a utility grid to generate data that may be used to reduce the uncertainty in grid models and/or improve the belief states 312 that are used to characterize or classify sensor responses of sensors on the grid.

Sensor data 322 is raw waveform outputs from transducers that measure grid-relevant metrics such as line temperature, line sag, voltage, current, gas or water flow rates, or gas pressures that are collected by sensor network 324 that is situated in, on or near the utility grid. The sensor data may be parsed by the time and location of its collection to associate it with particular signal injections, and that associated sensor data may be used to validate and confirm or falsify some belief states 312. The sensor data may also be used with the belief states 312 to create a representation of grid conditions and guide active grid control and management efforts such as fault identification, fault restoration, management of power quality, grid capital planning, renewable source integration, or improving grid component longevity through grid parameter management.

Figure 6:
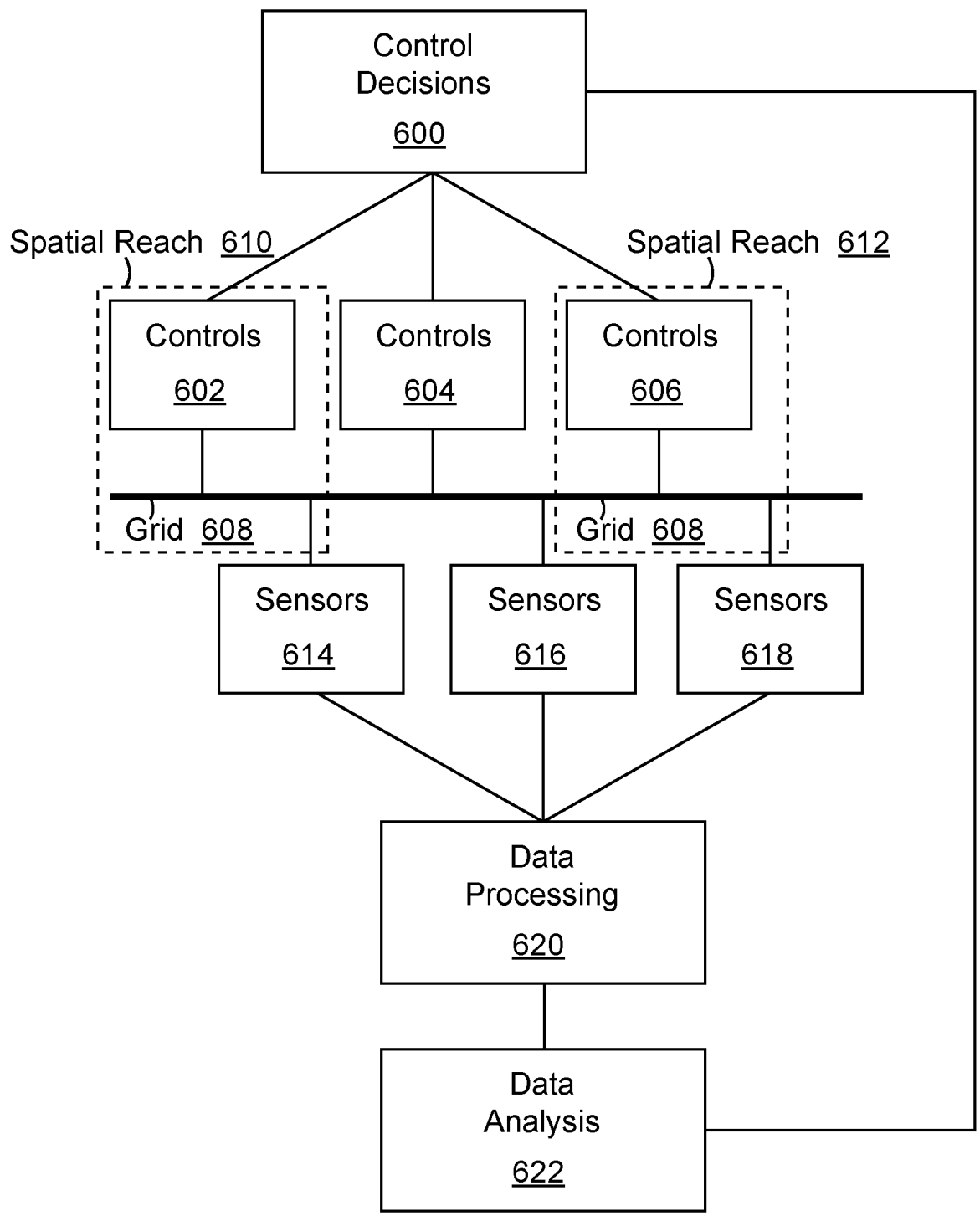
FIG. 6 is diagram depicting the architecture of system embodiments and their interactions with a utility grid.

A simple example of an overall architecture involving an example embodiment of the invention is presented in FIG. 6. The control decision layer 600 makes decisions about the states for some or all gird controls. Grid control decisions are made according to methods ensuring that the manipulation of controls creates samples that do not influence one another, and optionally selecting the control decisions to provide high learning value or to improve particular grid parameters such as ensuring certain voltage levels in electrical grids, or flow rates in gas or water grids. The control decisions from the control decision layer 600 are carried out by the controls 602, 604, and 606. Examples of particular controls include capacitor bank switches, load tap changers, switches and storage devices on electrical grids, or valves and sources on water and gas grids. The controls may carry out the control decisions by, for example, actuating switches, moving load tap changer positions, and narrowing or widening valves. The actions of the controls change grid parameters, and those changes propagate through the grid 608. For example, opening a valve on a gas grid may cause pressures to increase downstream over time, within a certain distance from the valve, or in an electrical grid, power quality and reactive power levels may change based on the switching on or off of a capacitor bank. Sensors 614, 616, and 618 placed along the grid measure grid parameters, and detect the propagation of the signal injection through the grid 608. The signal injections are limited in the extent to which they propagate through the grid 608, defined as the spatial reach of that signal injection such as the spatial reach 610 outlining the region affected by the signal injected by control 602 and including the connection of sensor 614 to the grid 608, and spatial reach 612 outlining the region affected by the signal injected by control 606 and including the connection of sensor 618 to grid 608. Data processing layer 620 associates the data from sensors 614, 616, and 618 with signal injections whose spatial and temporal reaches include the sensor data, for example associating data from sensor 614 with data from a signal injection implemented by control 602 based on spatial reach 610, and associating data from sensor 618 with a signal injection implemented by control 606 based on spatial reach 612. The associated sensor data from the data processing layer 620 is then analyzed by the data analysis layer 622 to determine understandings about grid behavior and sensor response. This understanding of grid behavior generated by the data analysis layer 622 may, for example, take the form of sensor response models which are used to interpret the outputs from grid sensors 614, 616, and 618 during ordinary operations, for example to set thresholds or alerts for brownout conditions when voltage drops in an electrical line, or setting an alert for methane levels crossing normal operational thresholds. The data analysis layer 622 may interface with the control decision layer 600 to iteratively coordinate and implement signal injections into the grid and provide information that improves the selection of signal injections to implement, for example by predicting the effects of a signal injection on the grid or computing the extent to which learning may be refined by a particular signal injection.

The invention claimed is:

1. A method for injecting signals into a utility grid, comprising:
   receiving a spatial reach and a temporal reach for each signal injection of a plurality of signal injections;
   computing a learning value for each signal injection in the plurality of signal injections;
   computing an expected effect value for each signal injection in the plurality of signal injections;
   selecting, based on the learning values and expected effect values, a set of signal injections wherein the spatial reach and temporal reach of each signal injection do not both overlap the spatial reach and temporal reach of another signal injection in the set; and
   injecting the selected set of signal injections into a utility grid,
   wherein the signal injections are changes in the state of grid controls,
   wherein the grid controls are at least one of load tap changers, switches, and storage devices on electrical grids.

2. The method of claim 1, further comprising measuring the utility grid response to the injected signals.

3. The method of claim 2, further comprising associating data from the sensors with signal injections based on the time and location of the sensor data and the spatial reach and temporal reach of the signal injections.

4. The method of claim 1, wherein the learning value is computed based on a number of belief states that may be falsified by grid response to the signal injection.

5. The method of claim 1, wherein the learning value is computed based on a predicted change in the width of confidence intervals for grid response to the signal injection.

6. The method of claim 1, wherein the expected effect value is computed based on a database of the effects of prior signal injections.

7. A method for injecting signals into a utility grid, comprising:
   receiving a spatial reach and a temporal reach for each signal injection of a plurality of signal injections;
   computing a learning value for each signal injection in the plurality of signal injections;
   computing an expected effect value for each signal injection in the plurality of signal injections;
   selecting, based on the learning values and expected effect values, a set of signal injections wherein the spatial reach of each signal injection overlaps the temporal reach of each same signal injection; and
   injecting the selected set of signal injections into a utility grid with the overlapping spatial and temporal reaches,
   wherein the signal injections are changes in the state of grid controls.

8. The method of claim 7, further comprising measuring the utility grid response to the injected signals.

9. The method of claim 8, further comprising associating data from the sensors with signal injections based on the time and location of the sensor data and the spatial reach and temporal reach of the signal injections.

10. The method of claim 7, wherein the learning value is computed based on a number of belief states that may be falsified by grid response to the signal injection.

11. The method of claim 7, wherein the learning value is computed based on a predicted change in the width of confidence intervals for grid response to the signal injection.

12. The method of claim 7, wherein the expected effect value is computed based on a database of the effects of prior signal injections.

13. A method for injecting signals into a utility grid, comprising:
   receiving a spatial reach and a temporal reach for each signal injection of a plurality of signal injections;
   computing a learning value for each signal injection in the plurality of signal injections;
   computing an expected effect value for each signal injection in the plurality of signal injections;
   selecting, based on the learning values and expected effect values, a set of signal injections wherein the spatial reach and temporal reach of each signal injection do not both overlap the spatial reach and temporal reach of another signal injection in the set; and
   injecting the selected set of signal injections into a utility grid,
   wherein the signal injections are at least one of changing valves, pressures, and flow rates in a gas grid.

14. The method of claim 13, wherein multiple signal injections are concurrently implemented on the utility grid.

15. The method of claim 13, wherein the signal injections are coordinated by a Partially Observable Markov Decision Process.

* * * * *